United States Patent Office 3,456,533
Patented July 22, 1969

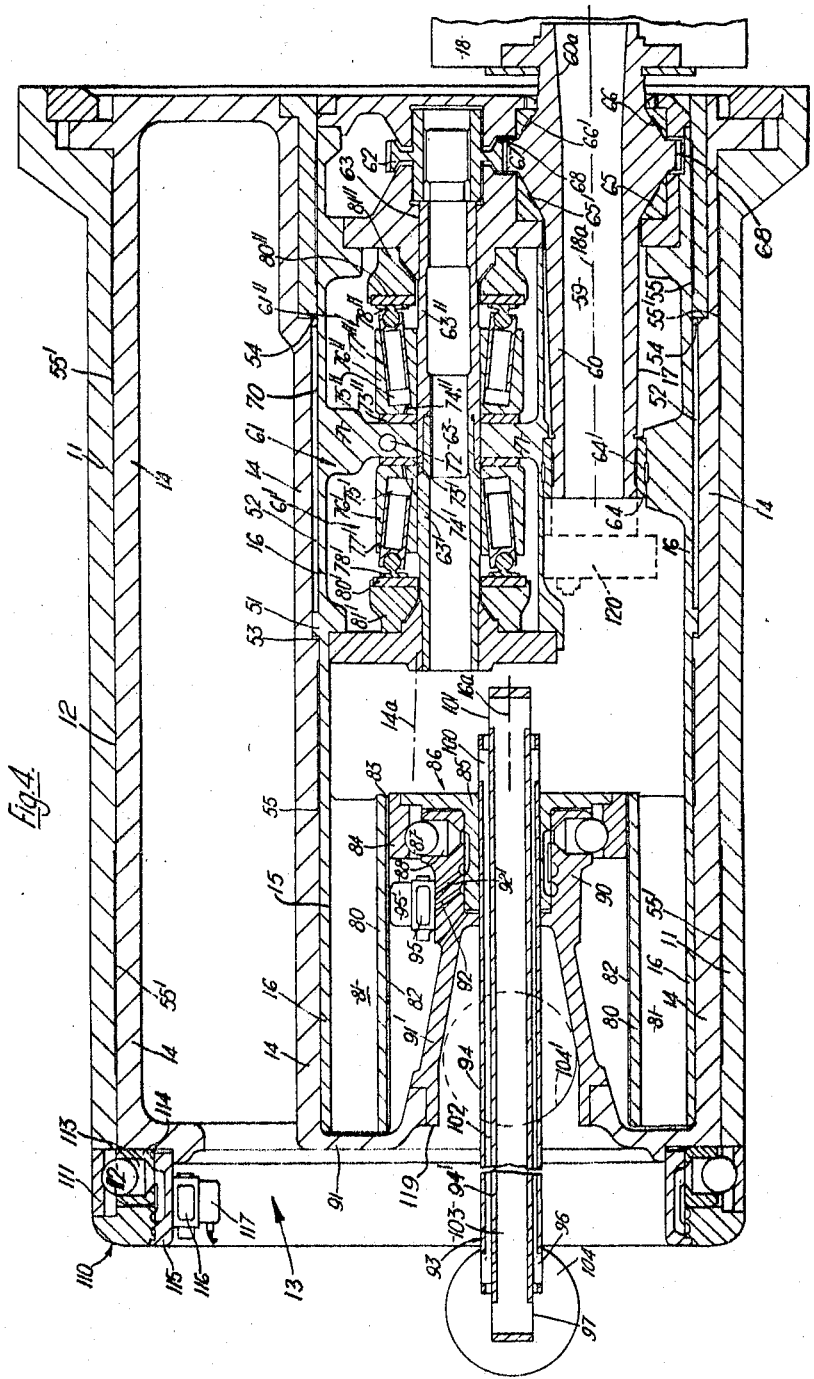

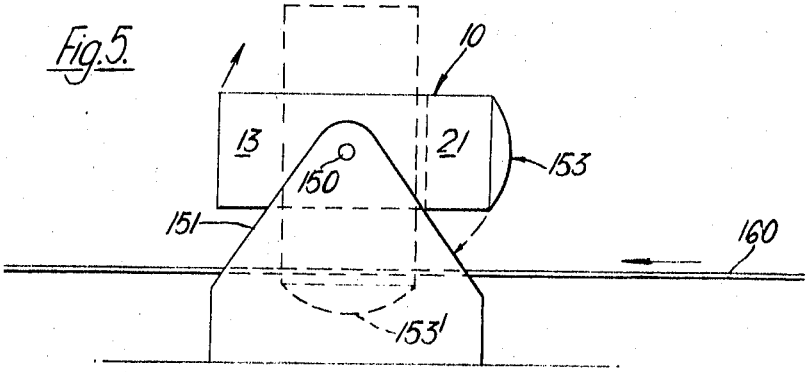
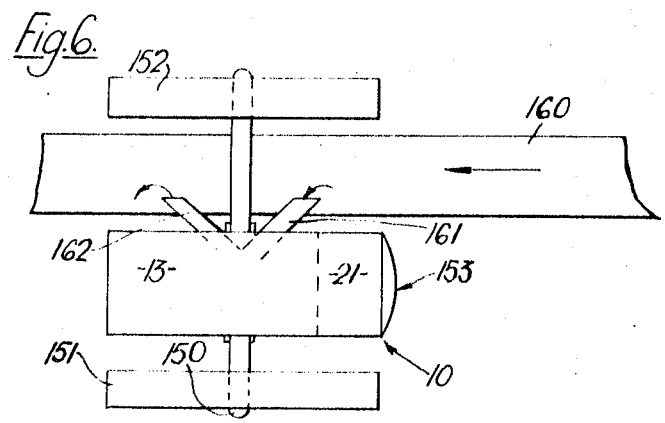

3,456,533
MACHINE TOOLS
Donald Firth and Sinclair Cunningham, East Kilbride, Glasgow, and Hugh Hair, University of Strath Clyde, Scotland, assignors to National Research Development Corporation, London, England, a corporation of Great Britain
Filed Aug. 3, 1966, Ser. No. 570,045
Claims priority, application Great Britain, Aug. 10, 1965, 34,229/65
Int. Cl. B23b 7/00
U.S. Cl. 82—2          10 Claims

ABSTRACT OF THE DISCLOSURE

A machine tool has a work chamber with at least one fixed tool holder therein, a translation device being provided for moving a workpiece holder axially to any position within the work chamber to bring a workpiece into machining engagement with a tool.

---

This invention relates to machine tools.

On conventional machine tools, having a tool and workpiece, it is usual to effect rotational movement of one of these members and to effect relative translational movement between the two members. Thus, for example, on a lathe it is usual to have the workpiece in a chuck which rotates about its own axis and the tool is mounted on slides and crossways for translational movement.

In most forms of conventional machine tools the necessary translational movement involves the use of slides and crossways, of screw feeds in each of three linear directions at right angles, and individual controls for each of the three movements which together provide the movement required.

According to the present invention, there is provided a machine tool having a work chamber, a rotatable workpiece holder mounted within and spaced from said work chamber, powered means for rotating the workpiece holder about its axis, at least one tool holder which is fixed within the work chamber, and a translational device within which the workpiece holder is mounted by means of which the workpiece holder is displaceable perpendicular to its axis of rotation to any selected position within the work chamber, and, also along its axis of rotation to bring a workpiece in said workpiece holder into machining engagement with a tool disposed in said tool holder.

Preferably the machine tool includes a housing which is connected to said work chamber, an outer cylindrical member rotatably mounted in the housing, and an intermediate cylindrical member rotatably mounted in said outer cylindrical member with its axis eccentric to the axis of said outer member, the workpiece holder being rotatably mounted in the intermediate member with its axis eccentric to the axis of the intermediate member, whereby the axis of the workpiece holder can be moved laterally by rotational movement selectively of the intermediate and outer cylindrical members.

With this arrangement, a very compact yet effective drive unit is provided which, due to the use of "nested" cylindrical members, is inherently rigid. The "nested" cylindrical members co-operate over their whole axial lengths and thereby provide rigid support for the object. The support provided for a workpiece is much more rigid than that which can be provided by the conventional translational devices for tools or workpieces on machine tool beds or mounting posts, since the device is effectively connected directly to the machine tool frame and for this reason alone the device is preferable. Moreover, the translational device is also much more compact than conventional devices which employ members mounted for linear movement in three directions and in which guides, slots and keyways are provided for guiding the members relative to each other in each of the three directions; with the present device no such guides, keyways and slots are required.

In conventional machine tools one drive is employed for rotating either the workpiece or tool about its own axis and an independently driven translational device is employed for effecting the lateral translational movement of the workpiece or tool respectively relative to the rotating part. By employing a common translational device which both rotates the workpiece about its own axis and effects lateral translational movement of the same tool or workpiece relative to the machine tool frame as it rotates, an even more compact drive arrangement is provided. It will, furthermore, be appreciated that the translational device forming part of the present invention can be housed within a single unit with a considerable saving in cost, weight and space.

In its preferred form, the drive is wholly hydraulic. Thus respective hydraulic ball motors may be provided for effecting relative rotation between the housing and the outer member and said outer member and the intermediate member. Similarly an hydraulic piston and cylinder device may comprise the means for effecting axial translational movement referred to above, and an hydraulic swash plate rotary motor may be provided for rotating the workpiece holder. All the hydraulic controls referred to above may be supplied with pressure fluid from a common constant pressure source and thus the whole operation of the machine tool can be controlled by simply controlling valves to each of the hydraulic components.

In such a machine tool the tool holder may comprise a plurality of tool holding members disposed within said housing whereby a workpiece can be moved by the workpiece holder into engagement with a tool at a selected station and rotated relative to said tool to perform a desired machining operation.

A machine tool in accordance with the present invention lends itself particularly to computer programme control. Operation of the machine tool can be wholly automatic and control is relatively simple since control of relatively few valves can effect all movements of the machine tool components required for any machine operation.

In adapting the machine tool for computer control, air gauges may be employed for sensing the size and shape of, for example, a workpiece being machined on the machine tool, signals from the air gauges being passed to the computer for comparison with predetermined patterns whereby further machining operations to provide a predetermined shape and size can be controlled automatically in the computer. Such air gauge testing arrangements are particularly useful to compensate for tool wear where many components of the same size and shape are required without changing the tools. Whereas on conventional machine tools manual adjustment of the tool or workpiece is required to compensate for tool wear, such adjustments may be rendered automatic using the present arrangement. Again, since lateral translational movement of the workpiece is combined with rotational movement of the workpiece, control of the machine tool may be arranged to provide a constant cutting speed for changing diameters automatically. In conventional machine tools the operator must vary the cutting speed to accommodate changes in diameter of the workpiece if efficient machining is to be effected. With the present invention optimum cutting speed can be maintained for all machining operations and changes in diameter.

A plurality of equi-angularly spaced apart tool holding members may be provided at axially spaced locations within the work chamber. In one embodiment the said housing encloses a substantially cylindrical work chamber, the workpiece holder projecting through one end face thereof, and said tool holding members being spaced along the cylindrical inner surface thereof. The other end of said chamber may be open, the work chamber being pivotally mounted on supports for movement between a generally horizontal disposition in which the machine tool may be set up and a vertical disposition in which the machine tool is operated. In this vertical position the open end of the working chamber is lowermost whereby swarf, cooling fluid and any other waste materials may fall from the work chamber. By such an arrangement a serious problem in the machine tool industry is at once solved since waste materials are continuously and effectively removed from the work chamber.

In one particular application of the present machine tool as a lathe the cylindrical work chamber within which the workpiece is disposed for the machining operation may be little more than twice the diameter of the workpiece. Thus for machining a workpiece twelve inches in diameter, the working chamber and indeed the whole machine tool including the drive may be housed in a cylinder the diameter of which is two feet.

In the application of the machine tool as a lathe, and particularly where the tools are housed within a cylindrical work chamber surrounding the workpiece, an extremely compact arrangement is provided. Since, by suitable programme control any translational movement of the workpiece can be effected within the working chamber, composite shapes can be cut on the workpiece with a single standard tool and in a single machining operation. Thus single conventional tools can be used for any copy turning required, whereas in conventional machine tools a special tool must be provided or alternatively, two or more machining operations would be required to provide the copy turning.

In other applications of the machine tool the support may be constituted by a collet for holding tools, no working chamber being provided. The tool in its operative position may be disposed adjacent to a conveyor belt on which move objects to be machined. As each object is moved into position adjacent the machine tool, the machining operation can be effected and the object can then be passed on to a further machining operation. By disposing a store of tools adjacent the collet, the drive may be suitably programmed to effect tool changes as required. Thus different machining operations may be effected with the same machine tool or, alternatively, the tool may be changed when worn.

The invention is illustrated, merely by way of example, in the accompanying drawings, in which:

FIGURE 4 is a part-sectional elevation of the drive design of the device shown in FIGURE 1;

FIGURE 5 is an elevation of a device similar to that of FIGURES 1–4 but somewhat modified to provide continuous production;

FIGURE 6 is a plan of the device shown in FIGURE 5; and

Figure 1:
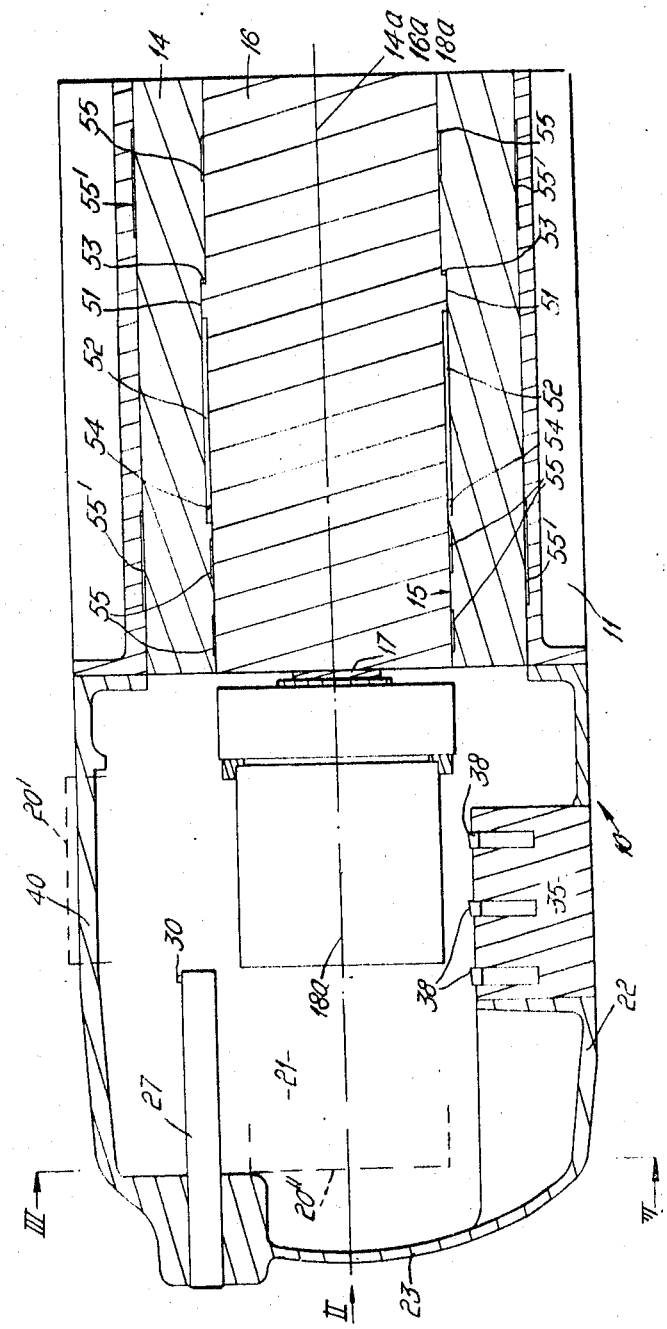
FIGURE 1 is an axial section through a machine tool according to the invention, the section being taken on the line I—I of FIGURE 2.

Referring to FIGURES 1 to 4 of the drawings, there is shown a lathe 10 having a rigid substantially cylindrical housing 11 which is provided with a cylindrical bore 12 and which forms part of a translational deivce 13. Rotatably mounted within bore 12 is a cylindrical outer member 14 having an axis of symmetry 14a. The outer member 14 is provided with a cylindrical bore 15 which is disposed eccentrically with respect to the housing member 14 and within which there is rotatably and axially slidably mounted a cylindrical intermediate member 16 having an axis of symmetry 16a. A drive shaft 17 carrying a workpiece holder or chuck 18 is eccentrically mounted on the intermediate member 16, the axis of symmetry of the shaft 17 and chuck 18 being indicated at 18a. Chuck 18 is adapted to hold a workpiece 20 shown in FIGURE 1 as a solid cylindrical member.

Chuck 18 and workpiece 20 are disposed within a substantially cylindrical work chamber 21, the walls of which form part of the rigid housing 11. Cylindrical chamber 21 is defined by cylindrical side wall 22, and a closed end wall 23, the opposite end of the cylindrical chamber 21 being open to accommodate the drive shaft 17 of chuck 18.

Figure 3:
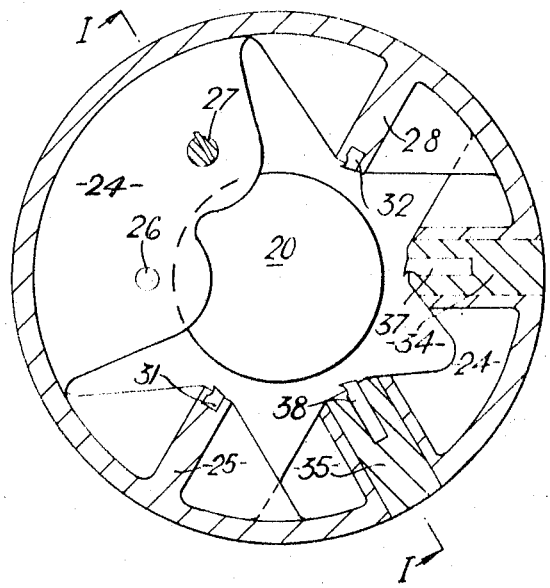
FIGURE 3 is an end elevation of some of the components shown in FIGURE 1, taken on the line 3—3 of that figure.
Figure 7:
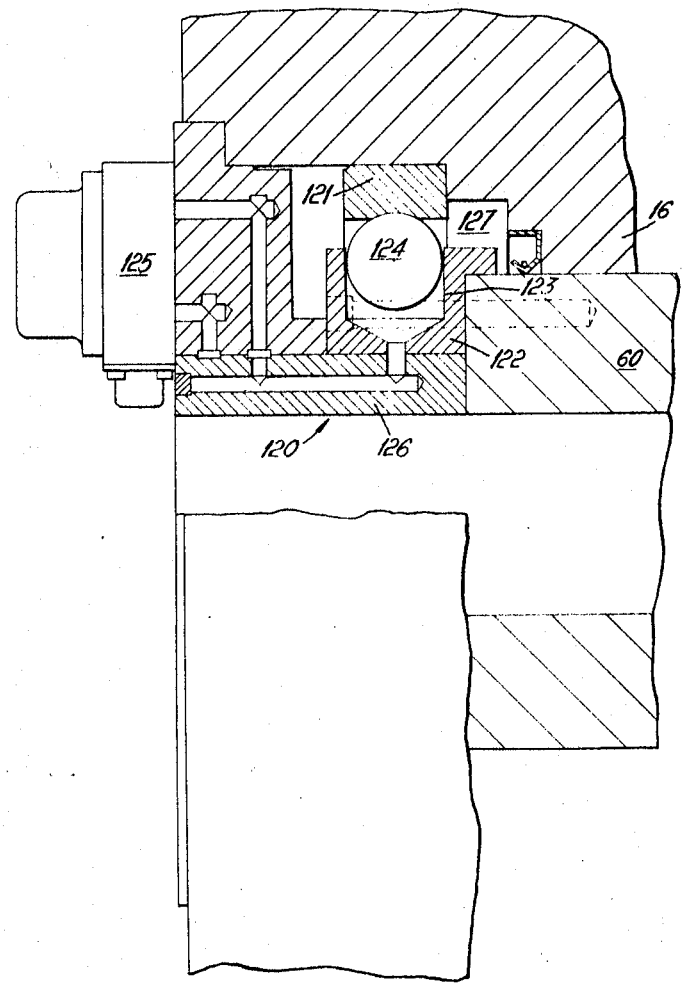
FIGURE 7 is a partial sectional on an enlarged scale of an hydraulic ball motor employed for low-speed driving of part of a translational device according to the invention.

As clearly seen in FIGURES 1 and 3, the cylindrical chamber 21 is provided with two axially spaced sets of lands 24, 24', each of which provides tool holders. Land 24, which is disposed closest to the closed end wall 23 of the chamber 21, is provided with four tool holders 25, 26, 27, 28, angularly spaced apart about the cylindrical chamber. Tool holder 26 is adapted to contain a drill with its axis disposed parallel with the axis of the workpiece 20 and lathe. Tool holder 27 is in the form of a cylindrical rod provided at its end with a tool bit 30. In FIGURE 3, tool holders 25, 28 are shown provided with tools 31, 32.

Land 24' is provided with two sets of tool holders 34, 35 each of which is provided with sets 37, 38 of three tools.

On the side of the cylindrical chamber 21 opposite the land 24' the cylindrical side wall 22 of the chamber 21 is cut way to provide a workpiece loading aperture 40.

It will be appreciated from the above description that all the tools are firmly embedded in tool holders which are rigidly fixed relative to the rigid body of the machine and therefore tool chatter and similar vibration will not be experienced during machining operations.

Since the tools are fixed in position, it will be appreciated that the work-piece 20 must be moved linearly with respect to the tool holders to enable satisfactory machining operations to be effected. The intermediate member 16 contains a motor for rotating the chuck 18 and the workpiece 20 about the axis 18a, and suitable components, as hereinafter described, are provided for moving the workpiece 20 linearly within chamber 21 both along the axis of the chamber and transversely thereof.

Means, described in more detail below, are provided for rotating the outer member 14 within bore 12 about axis 14a and for independently rotating the intermediate member 16 relative to outer member 14 about axis 16a. If, in the position shown in FIGURE 2, the distance between axes 14a and 16a is $x$ and the distance between axes 16a and 18a is $y$, then upon relative rotation between the outer member 14 and housing 11, chuck 18 will be rotated about axis 14a with the axis 18a of the chuck describing a circular locus, the centre of which is at 14a and of radius $(x+y)$. If, on the other hand, the intermediate member 16 is rotated relative to the outer member 14, chuck 18 will rotate about axis 16a, the centre 18a of the chuck 18 describing a circular locus about axis 16a, the radius of which is $y$. It will be appreciated that relative rotation between the three members 14, 16, 18 can be effected in either direction and that, by suitable rotation between these members, chuck 18 can be disposed in any one of an infinite number of positions transversely of the axis 14a of the headstock 13.

Figure 2:
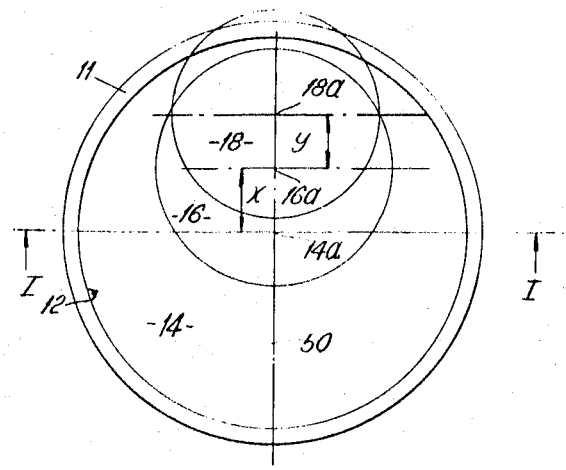
FIGURE 2 is a diagrammatic end view showing the arrangement of some of the components of the device shown in FIGURE 1 taken in the direction of arrow II of that figure.

The drive to the members 14, 16, 18 is preferably such that for a one degree rotation of the outer member 14 relative to the housing 11 in one sense, together with a two degree rotation of the intermediate member 16 relative to the outer member 14 in the opposite sense, the axis 18a of chuck 18 will be displaced linearly with respect to the axis 14a along the common diameter 50, shown in FIGURE 2. With a housing 11 of the order of two feet in diameter, such rotation may result in a linear displacement of 0.001″.

It will be appreciated that, by suitable control of the relative rotations of the members 14, 16 and 18, the workpiece 20 can be made to move laterally with respect to the axis of the lathe, and linearly with respect to the tools in the chamber 21. Thus, referring to FIGURE 1 the workpiece 20 can be moved from the position shown in full lines, either towards the tools 38 or away from the tools 38 to the position shown for example in broken lines at 20′ at which it will be at its farthest distance from the tools 38. When the workpiece is in the position shown in 20′, the components 14, 16, 18 will be in the relative position shown in FIGURE 2.

The intermediate member 16 is cylindrical and is provided intermediate its ends with an annular flange 51. Flange 51 is disposed within a cylindrical groove 52, cut in the bore 15 of the outer member 14. Oil inlet and outlet ports 53, 54 are provided at the axial ends of the cylindrical groove 52. By urging oil into ports 53 and withdrawing it through ports 54 it will be appreciated that the intermediate member 16 can be made to move axially from the position shown in FIGURE 1 until workpiece 20 moves from the full line position shown in FIGURE 1 to the broken line position indicated at 20″. In this position, flange 51 will be disposed adjacent port 54. By feeding oil to ports 54 and withdrawing it from ports 53, the intermediate member 16 can be made to return to the position shown in FIGURE 1. Thus workpiece 20 is provided with linear movement relative to the tools in chamber 21 and parallel with the axis of chamber 21. Hydrostatic bearings 55 are provided between the bore 15 and the intermediate member 16 to ease the relative axial sliding movement therebetween.

Thus it will be appreciated that workpiece 20 is provided with linear relative movement both parallel with and transversely of the axis of chamber 21, and thus the workpiece 20 can be disposed in any position within the chamber 21 and can be rotated in that position to enable suitable machining operations to be effected by selected tools within the chamber. It will also be appreciated that machining can be effected by more than one tool at any one time, provided the workpiece 20 is suitably located with respect to these tools.

As pointed out above, the tools are all held rigidly within tool holders which are fixed relative to the rigid body of the machine and thus vibration of the tools is avoided. Similarly, workpiece 20 is seen to be held within a chuck or collet which is supported by members 14 and 16 which are cylindrical and are thus supported over a substantial axial length within a rigid bore of the machine body. In view of the extent to which the cylindrical members are supported, chuck 18 and thus workpiece 20 will be subject to very little vibration since the supporting arrangement is substantially vibration free.

A preferred form of the translational device 13, including means for moving intermediate member 16 axially with respect to the outer member 14 and for rotating said outer member 14 relative to housing 11 and the intermediate member 16 relative to outer member 14 will now be described with reference to FIGURE 4.

Referring firstly to the right hand end of FIGURE 4, the drive for the chuck 18 to effect rotation thereof about its own axis, is shown in detail. It will be noted that the intermediate member 16 is in the form of a hollow cylinder within which a driving mandrel 60 is rotatably mounted with its axis coincident with the axis 18a, the mandrel 60 being provided with a tapered section 60a to receive the tapered arbor of the chuck 18, and with a composite hydraulic swash plate motor 61 mounted eccentrically of the intermeditae member 16, and adapted to rotate mandrel 60 about its axis of symmetry through a gear wheel 62 mounted on the shaft 63 of the swash plate motor.

Mandrel 60 is mounted at its rear end within a bearing sleeve 64 and adjacent its front end within a pair of axially inclined bearing sleeves 65, 66. The bearing sleeves 64, 65 and 66 provide hydrostatic bearings for centering the mandrel 60, the hydrostatic bearings being of the type described with reference to and as shown in Figures 7–10 of the British patent specification No. 893,848. Oil under pressure is fed to the bearings 64′, 65′, 66′ through oil pressure lines which are not shown in the drawings.

The axially inclined bearing sleeves 65, 66 are disposed on either side of a hub 67 provided about its circumference with a gear ring 68. Gear ring 68 meshes with the teeth of gear wheel 62 to transmit drive from the common shaft 63 of the composite swash plate motor 61 to the mandrel 60.

Swash plate motor 61 is enclosed within a cylindrical housing 70 which is formed integral with the cylindrical casing of the intermediate member 16 where it meets this casing, i.e. at the uppermost part of member 16 as seen in FIGURE 4. Housed within cylindrical casing 70 are two swash plate motors 61′, 61″ acting in parallel and together constituting the composite swash plate motor 61. Motor 61′ is provided with a drive shaft 63′ and motor 61″ is provided with a drive shaft 63″, the shafts 63′ and 63″ being interconnected to form the common drive shaft 63.

The motors 61′, 61″ are symmetrically arranged about a central dividing wall 71 which contains the inlet and outlet ducts and ports for the swash plate motors. One such port is shown at 72. Disposed on axial adjacent faces of wall 71 are port plates 73′, 73″. These plates may be preset to an angular position or may be adjustable in operation (for the purposes explained in specification 893,848) to modify fluid flow to and from passages 74′, 74″ of a plurality of equi-angularly spaced apart cylinders 75′, 75″ formed within cylinder blocks 76′, 76″.

Slidably mounted within each of the cylinders 75′, 75″ is a plurality of pistons 77′, 77″ pivotally connected at their ends to slippers 78′, 78″. The slippers 78′, 78″ are slidably mounted on annular slipper plates 80′, 80″, each fixed to one face of a swash plate 81′, 81″ respectively. The angular disposition of swash plates 81′, 81″ about an axis in the plane of the figure and normal to the axis of the common shaft 63, is variable by hydraulic means (not shown). By varying the angular disposition of swash plates 81′, 81″, the stroke of the pistons 77′, 77″ can be varied independently and thus the output of the swash plate motors can be independently varied.

By suitably controlling pressure oil flow to and from the cylinders 75′, 75″, the motors 61′, 61″ are caused to rotate the common shaft 63 about its axis and thus rotate chuck 18 about its own axis. Two motors are employed instead of a single swash plate motor, since, for relatively small power outputs, a single motor can be employed at its design conditions, this being preferable to using a single motor at half power output, since this is less efficient.

A more detailed description of the construction and operation of the swash plate motors 61′, 61″ can be obtained from the specifications to British Patent Nos. 893,848 and 952,841. The swash plate motors 61′, 61″ are substantially identical with those disclosed in these specifications, except that the swash plates of the present motors are not mounted on trunnions as described in said specifications 893,848 and 952,841. A separate hydraulic control arrangement is provided for pivoting the swash plates relative to the axis of the common shaft, this arrangement not being described or shown in the present specification.

The arrangement will now be described whereby the intermediate member 16 can be rotated relative to the outer member 14, and member 14 can be rotated relative to the bore 12 within the housing 11. As described above, these relative rotary movements provide the transverse linear movement of chuck 18 relative to tool holders within chamber 21.

Referring now to the left hand end of FIGURE 4, the details of two hydraulic ball motors are illustrated, these ball motors being employed for rotating the members 14 and 16 relative to one another and to the housing 11. As seen in FIGURE 4, the intermediate member 16 is provided internally with a cylindrical sleeve 80 supported from the external cylindrical surface by webs 81. Sleeve 80 is provided at its internal surface with a plurality of axially extending splines 82 which mesh with splines 83 formed on the external surface of an eccentric cam ring 84. The splines may be provided with hydrostatic bearing pads to reduce wear. Eccentric cam ring 84 is connected to, and forms part of, a pintle 85 of a hydraulic ball motor 86 adapted to rotate the intermediate member 16 relative to the outer member 14. A plurality of balls 87 are slidably and rotatably disposed within a plurality of equiangularly spaced apart cylinders 88 provided in an annular cylinder block 90.

By a set of oil pressure grooves and ducts within pintle 85 the radially inner ends of cylinders 88 communicate with either one of two oil pressure ducts 92, 92′ formed within cylinder block 90 and communicating with an electrically operated hydraulic valve 95 such, for example, as that sold by Moog Servo Controls Co. Inc. The "Moog" valve 95 is mounted on cylinder block 90 and is controlled by an electrical control device 95′ to provide pressure fluid to or withdraw it from respective cylinders 88, as required. By urging pressure fluid into and withdrawing it from selected cylinders 88 about the cylinder block 90, forces acting on the respective balls 87 can be varied such that the eccentric cam ring 84, upon which the balls 87 bear, can be rotated relative to the cylinder housing 90. Since the eccentric cam ring 84 is splined to the sleeve 80 of the intermediate member 16, member 16 will be rotated relative to cylinder housing 90 and thus relative to the outer member 14, to which cylinder housing 90 is connected by radially disposed wall portion 91 and frusto-conical port 91′.

The construction of the hydraulic ball motor and a more detailed consideration of its mode of operation is contained in British patent specification No. 906,553.

The sleeve 80 is connected to the eccentric cam ring 84 by splines 82, 83, such that the drive therebetween can be maintained even when the intermediate member 16 is moved axially with respect to the outer member 14. Also designed to accommodate relative axial movement between the intermediate member 16 and the outer member 14 are supply pipes 93 for supplying oil under pressure to and withdrawing oil under pressure from the composite swash plate motor 61 and hydrostatic bearings 64′, 65′, 66′. The pipes comprise concentric tubes 94, 94′ provided at one end with ports 96, 97 respectively and at their other end within the intermediate member 16, with ports 100, 101 respectively. Between tubes 94, 94′ there is defined an annular space 102 within which pressure oil can flow from port 96 to port 100 and vice versa. Tube 94″ defines therein a cylindrical bore 103 which constitutes a passage for pressure fluid from port 97 to port 101 and vice versa. A spherical ball joint connection 104 is provided about the end of tubes 94, 94′ adjacent ports 96, 97 to connect the ports 96, 97 to connections for flexible hoses from the constant pressure fluid supply. The spherical joint 104 permits relative rotation between the flexible hoses and the tubes 94, 94′ such that the supply and withdrawal of pressure fluid to and from tubes 94, 94′ is still maintained even when the intermediate member 16 is rotated relative to the outer member 14.

The pressure fluid leaving and entering the ports 100, 101 passes to and from bearings 64′, 65′, 66′ and ports 72 of the hydraulic swash plate motor 61 to operate this motor. Upon relative axial movement between the intermediate member 16 and the outer member 14, the intermediate member 16 will move to the right, as seen in FIGURE 4, and the spherical joint 104 will assume a new position indicated in broken lines at 104′ in which it is disposed with the interior of the frusto-conical portion 91′ of the intermediate member 16.

A hydraulic ball motor 110, similar in construction to ball motor 86 is provided for rotating the outer member 14 relative to housing 11. As seen in FIGURE 4, the hydraulic ball motor 110 comprises an eccentric cam ring 111 which is connected to the housing 11. Bearing against the eccentric cam ring 111 is a plurality of balls 112, each disposed within a radially extending cylindrical cylinder 113. A plurality of equiangularly spaced apart cylinders 113 are provided within an annular cylinder housing 114 which is connected to the end face of the outer member 14. Disposed at the radially inner end of cylinder housing 114 is a pintle 115. Pintle 115 is provided with passageways which communicate with respective cylinders 113 to provide fluid pressure to and withdraw fluid pressure from said cylinders. A Moog valve 116 is provided for controlling pressure fluid flow to and from the cylinders and the Moog valve 116 is controlled by an electrical control device 117.

By urging pressure fluid to selected cylinders 113 and withdrawing pressure fluid from other cylinders 113, balls 112 are urged against the eccentric cam ring 111 such that a reaction is set up between housing 11 and the outer member 14 to rotate one relative to the other. As a result of this reaction, cylinder housing 114 and member 14 conneced thereto are rotated relative to housing 11 and pintle 115 which are, of course, connected to the rigid framework of the machine.

As with hydraulic ball motor 86, a more detailed description of ball motor 110 is contained in the specification of British Patent No. 906,553.

The pressure fluid for operating swash plate motor 61 to rotate the workpiece about its own axis, the pressure fluid supplied to ports 53, 54 for moving the workpiece parallel with the axis of the machine, and the pressure fluid applied to ball motors 86 and 110 for rotating the members 11, 14 and 16 relative one to the other, is all supplied from the common supply (not shown). Oil under pressure for the swash plate motor 61 and for the ports 53, 54 is provided through the tubes 94, 94′, oil under pressure for hydraulic ball motor 86 is provided through inlets at 120 on the end of frusto-conical member 92, and oil for the ball motor 110 is provided through apertures at 121 on the end face of the housing 11.

With the control arrangements described above, the workpiece on the end of the chuck 18, as well as being rotated about the axis of the chuck, can be moved axially or transversely of the machine and thus linearly of the tools within chamber 21. It will also be appreciated that both rotary and linear movement of the workpiece is effected, apart from the electrical connection to controls 95 and 117, wholly by hydraulic means, the only mechanical drive in the translational device 13 being that between gear wheel 62 and the drive spindle 60.

Although manual control can be provided for controlling operation of the swash plate motor 61, of the hydraulic ball motors 86 and 110, and also of the piston and cylinder arrangement 51, 52, a suitable computer programme can be devised for controlling all these operations to provied the desired sequence of operations for machining to be effected on a given workpiece. It will be appreciated that control of pressure fluid feed to and from the translational device 13 can be used to control all operations of the machine, including speed of rotation and universal translational movement and speed.

It may be desirable for some purposes to position the mandrel 60 angularly without causing continuous rotation of the mandrel, for example if the workpiece is to be held by the chuck 18 in a predetermined fixed position while machining operations are carried out on it. The swash plate motors 61′, 61″ are not ideally suitable for this function as they are designed for relatively high speed rotation, and what is required is a low speed high torque drive. An hydraulic ball motor of the same general kind as the ball motor 86 is more suitable.

A ball motor 120 mounted within the intermediate member 16 for driving the mandrel 60 is shown in broken outline in FIGURE 4 and in section on an enlarged scale in FIGURE 9. The motor 120 has an eccentric cam ring 121 which is secured to the intermediate member 16 and a rotatable cylinder block 122 which is bolted to the end of the mandrel 60. The cylinder block 122 is provided with a plurality of cylinders 123 in which respective balls 124 are slidably mounted, the cylinders 123 being supplied with fluid pressure under control of an electrically operated hydraulic valve 125 by way of ducts in a central fixed pintle 126.

When it is desired to position the chuck 18 or rotate it slowly, the swash plate motors 61', 61" are inoperative and the ball motor 120 is operative. The balls 124 engage the cam ring 121 and fluid pressure is supplied to the cylinders 123 in succession to cause rotation of the cam ring 121 and mandrel 60 to the desired angular position. Fluid which leaks past the balls 124 fills a casing 127 of the ball motor, fluid pressure in the casing 127 being relieved by way of a valve (not shown).

In order to reduce unnecessary drag on the mandrel 60 when the swash plate motors 61', 61" are operative, the balls 124 are moved radially inwardly out of engagement with the cam ring 121 when the cam motor 120 is inoperative. This is effected by pressurising the casing 127 by restricting the leakage flow therefrom and operating the valve 125 to connect all the cylinders 123 to a low fluid pressure.

Referring to FIGURE 5, there is shown an alternative embodiment in which the machine tool 10 including the translational device 13 and chamber 21 is pivotally mounted on trunnions 150 on two supporting pillars 151, 152. The working chamber 21 is disposed at one end of the machine tool 10 but end plate 23 of chamber 21 is removed to provide the chamber with a free open end 153.

The machine tool 10 is pivotable about trunnions 150 from the horizontal position shown in full lines in FIGURE 5 to the broken line position shown in FIGURE 5. In the horizontal position the workpiece and tools may be set up by an operator. In a vertical position the open end 153 is disposed at 153' and thus swarf, cooling fluid and any other waste materials may fall freely from the working area within the working chamber out through the open end of the chamber 21 and thus onto a conveyor or into a suitable receptacle (not shown) for receiving the waste materials. This provides a substantial advantage over conventional machine tools in which swarf and cooling fluid removal is a severe problem. With the present simple mounting arrangement for this machine tool, swarf, cooling fluid and other waste materials are automatically and swiftly removed.

Also shown in FIGURES 5 and 6 is a conveyor 160 on which workpieces 20 are fed to and withdrawn from the machine tool 10. The workpieces 20 can be fed from the conveyor 160 into the work chamber 21 via a vibrating feeder 161 and withdrawn from the work chamber 21 onto the conveyor 160 via a slide or chute 162. The loading and unloading of the workpieces 20 between machining operations can be effected purely automatically and thus the machine 10 can be operated on a continuous basis without supervision.

The invention greatly simplifies the control required of the workpiece and thus machine tools according to the invention are particularly suitable for control by computer programme. Also, vibration and tool chatter can be substantially eliminated and a yet rigid and positive drive is provided.

A further advantage of the device shown in the drawings is the relative compactness of the device, the elimination of errors due to worn guides, backlash in feed screws and the like, and the considerable saving in manufacturing expense due to the use of simple surfaces of revolution (i.e. simple cylindrical surfaces) in the device as opposed to the relatively complex T-shaped guides and grooves required in the slots and guideways of conventional translational devices.

We claim:

1. A machine tool having a work chamber, a rotatable workpiece holder mounted within and spaced from said work chamber, powered means for rotating the workpiece holder about its axis, at least one tool holder which is fixed within the work chamber, and a translational device within which the workpiece holder is mounted and by means of which the workpiece holder is displacable perpendicular to its axis of rotation to any selected position within the work chamber, and also along its axis of rotation, to bring a workpiece in said workpiece holder into machining engagement with a tool disposed in said tool holder.

2. A machine tool as claimed in claim 1 including a housing which is connected to said work chamber, an outer cylindrical member rotatably mounted in the housing, and an intermediate cylindrical member rotatably mounted in said outer cylindrical member with its axis eccentric to the axis of said outer member, the workpiece holder being rotatably mounted in the intermediate member with its axis eccentric to the axis of the intermediate member, whereby the axis of the workpiece holder can be moved laterally by rotational movement selectively of the intermediate and outer cylindrical members.

3. A machine tool as claimed in claim 2 wherein the cylindrical outer member is provided with an axially extending bore within which the cylindrical intermediate member is slidably mounted, said bore including an annular chamber, the intermediate member is provided with an external annular circumferential flange slidably disposed in said annular chamber and effective as a piston, and wherein means are provided for supplying hydraulic fluid to, and withdrawing it from, each end of the said chamber, whereby the intermediate member can be caused to move axially of the outer member and so produce movement of the holder in the direction of the length of its axis relative to the housing.

4. A machine tool as claimed in claim 2 wherein hydrostatic bearings are provided between said housing, said outer member and said intermediate member.

5. A machine tool according to claim 1 in which said means for rotating the workpiece holder includes an hydraulic swash plate rotary motor.

6. A machine tool as claimed in claim 1 in which an hydraulic ball motor is provided for rotating said workpiece holder at relatively slow rotational speeds.

7. A machine tool as claimed in claim 1 wherein there are a plurality of equi-angularly spaced apart tool holding members at axially spaced locations within the work chamber.

8. A machine tool as claimed in claim 7 wherein said work chamber has a cylindrical inner surface, the workpiece holder projecting through one end face thereof, and said tool holding members being spaced along the cylindrical inner surface of the work chamber.

9. A machine tool as claimed in claim 8 wherein the other end of said chamber is open and supports are provided for pivotally supporting the chamber for movement between a generally horizontal disposition for setting up the machine tool and a vertical operative disposition in which the open end of said chamber is lowermost to enable swarf, cooling fluid and other waste materials to fall from the work chamber.

10. A machine tool as claimed in claim 8 wherein further tool holding members are provided in the other end face of said cylindrical work chamber.

(References on following page)

References Cited

UNITED STATES PATENTS

| | | | |
|---|---|---|---|
| 222,901 | 12/1879 | Heckendorn | 82—18 XR |
| 1,582,639 | 4/1926 | Cullen | 82—8 XR |
| 2,091,700 | 8/1937 | Cone | 82—30 XR |
| 2,312,354 | 3/1943 | Norberg. | |
| 2,352,753 | 7/1944 | Anderson. | |
| 3,030,744 | 4/1962 | Mueller | 82—30 XR |
| 3,141,365 | 7/1964 | Peters. | |

FOREIGN PATENTS

| | | |
|---|---|---|
| 958,798 | 2/1957 | Germany. |
| 1,112,871 | 8/1961 | Germany. |
| 721,744 | 1/1955 | Great Britain. |

LEONIDAS VLACHOS, Primary Examiner

U.S. Cl. X.R.

77—1